United States Patent [19]
Milliken

[11] Patent Number: 6,109,863
[45] Date of Patent: Aug. 29, 2000

[54] SUBMERSIBLE APPARTUS FOR GENERATING ELECTRICITY AND ASSOCIATED METHOD

[76] Inventor: Larry D. Milliken, 1715 Madison Ave., Dunmore, Pa. 18509

[21] Appl. No.: 09/192,917

[22] Filed: Nov. 16, 1998

[51] Int. Cl.⁷ .................................................. F03B 15/06
[52] U.S. Cl. .................. 415/1; 415/1; 415/4.2; 415/4.4; 415/60; 415/141; 415/146; 415/224; 415/906; 415/907; 415/7; 415/3.1
[58] Field of Search .................. 415/1, 3.1, 4.1, 415/4.2, 4.4, 146, 141, 60, 208.1, 211.1, 211.2, 224, 906, 907, 7

[56] References Cited

U.S. PATENT DOCUMENTS

| | | | |
|---|---|---|---|
| 376,357 | 1/1888 | Weeks | 415/906 |
| 950,676 | 3/1910 | Price | 415/7 |
| 2,379,324 | 6/1945 | Topalov | 415/4.2 |
| 3,644,052 | 2/1972 | Lininger | 415/7 |
| 4,134,710 | 1/1979 | Atherton . | |
| 4,163,904 | 8/1979 | Skendrovic . | |
| 4,163,905 | 8/1979 | Davison . | |
| 4,174,923 | 11/1979 | Williamson . | |
| 4,203,702 | 5/1980 | Williamson . | |
| 4,219,303 | 8/1980 | Mouton, Jr. et al. . | |
| 4,335,319 | 6/1982 | Mettersheimer, Jr. . | |
| 4,467,218 | 8/1984 | Andruszkiw et al. . | |
| 4,551,066 | 11/1985 | Frisz . | |
| 4,684,817 | 8/1987 | Goldwater . | |
| 4,748,808 | 6/1988 | Hill | 60/398 |
| 4,818,888 | 4/1989 | Lenoir, III . | |
| 4,850,190 | 7/1989 | Pitts . | |
| 5,009,568 | 4/1991 | Bell . | |
| 5,191,225 | 3/1993 | Wells . | |
| 5,266,006 | 11/1993 | Tsui et al. . | |
| 5,440,176 | 8/1995 | Haining . | |

*Primary Examiner*—Edward K. Look
*Assistant Examiner*—Ninh Nguyen
*Attorney, Agent, or Firm*—Arnold B. Silverman; David C. Jenkins; Eckert Seamans Cherin & Mellott, LLC

[57] ABSTRACT

A fully submersible apparatus for generating electricity from liquid flow as in an ocean or river current. A buoyant structure is fully submersible and has at least one pair of counter-rotating side-by-side motors with a plurality of angularly spaced radial vanes each having a plurality of rotatable subvanes such that current impinging upon the motor will impinge on a closed or solid vane to effect rotation of the motor and its shaft during a first phase of the rotational cycle and will impinge on open vanes for free passage therethrough on the return or second phase of rotation of the motor. Motors may also be provided with vanes in overlying and underlying relationship. An associated method is provided.

38 Claims, 6 Drawing Sheets

SUBMERSIBLE APPARTUS FOR GENERATING ELECTRICITY AND ASSOCIATED METHOD

BACKGROUND OF THE INVENTION

1. Field of Invention

This invention relates to improved submersible apparatus for generating electricity from unidirectional liquid flow and a related method. More specifically, the invention relates to an efficient, environmentally safe method of generating electrical power from the energy contained in ocean currents and river currents and the like.

2. Description of Related Art

As demand for electricity has grown with an ever increasing world population, the need for non-polluting, renewable alternative energy sources to replace fossil fuels has grown dramatically. Some of the alternative sources that have been considered and/or developed commercially during the last half of the twentieth century include those associated with wind, wave, tide, ocean current, river current, ocean thermal differential, nuclear, and geothermal energy.

The well known commercial limitations of nuclear power, geothermal power, and generation based upon differential thermal energy have eliminated these processes from consideration for greatly increased commercial application. Attention has focused on other uses, such as aerodynamic and hydrodynamic devices as means for safely and efficiently generating large quantities of electricity in the future. Such devices have generally been based upon fluid driven vaned motors caused to rotate by the force of the fluid impacting each motor vane. Efficient operation of such motors requires that resistance to rotation of the motor be minimized, the rotational speed of the motor be relatively constant over time, and the number of such motors accommodated within the device be maximized.

Devices containing one or more vaned rotating aerodynamic or hydrodynamic motors to generate electricity from fluid flow including wind and liquids such as ocean currents, river currents, and wave motion is known in the windmill and water wheel arts. The vanes in such motors may be oriented vertically or horizontally and are normally positioned radially with respect to the axis of rotation of the motor. A known means of maintaining relatively constant rotational speed and minimizing resistance to the fluid flow in such a motor is to orient each vane such that the surface area of the vane impacted by the fluid is maximized when the vane is moving in the direction of fluid flow and minimized when the vane is moving counter to the direction of fluid flow. A second known means to achieve the same end involves dividing each vane into subvanes that can be positioned to increase or decrease the surface area of the vane contacted by the fluid in response to the direction of fluid flow.

U.S. Pat. Nos. 4,551,066, 4,418,888, 4,684,817, 5,266,006, and 4,134,710, all disclose fluid-driven motors utilizing vertically oriented blades rotating about the vertical axis of the motor.

U.S. Pat. No. 4,551,066 discloses a completely submerged water wheel device having a plurality of pivotable vertical vanes circumferentially spaced around the axis of rotation of the wheel. Each vane is rotatable about its own central axis and pivots to minimize the surface area of the vane facing the incoming liquid flow when the vanes are moving counter to the direction of liquid flow and to maximize said surface area when the vanes were moving in the direction of liquid flow. Means are provided to limit the rotation of each vane to less than 360°.

U.S. Pat. No. 4,418,888 discloses a water wheel containing a number of vertically-oriented vanes pivotally attached to an upper and lower structure at the top and bottom, respectively, of each vane such that the outermost edge of each vane is free to rotate about the axis formed by its innermost edge. The wheel also contains controllable stops that limit the motion of each blade such that, when traveling in the upstream direction, the blades swing freely to a position parallel to the liquid flow, and when traveling in the downstream direction, the blade rests against one of the controllable stops such that the vane presents a solid surface for impact the liquid.

U.S. Pat. Nos. 4,684,817 and 5,266,006 both disclose windmills based upon an array of vertical vanes, each vane containing vertically pivotable subvanes configured such that the subvanes overlap in the closed position to provide a "solid" surface when moving in the direction of the wind and pivotally open to provide spaces through which the wind can pass in order to lower resistance when moving counter to the wind direction.

A wave-operated motor containing radially-oriented vertical vanes is disclosed in U.S. Pat. No. 4,134,710. In this device, each vertical vane is comprised of multiple horizontally-pivotable sub-vanes that close and overlap to provide a solid surface when the vane is traveling in the direction of the liquid flow and rotate around a horizontal axis to provide open areas through which the liquid can pass when the vane travels counter to the direction of liquid flow, thereby resulting in decreased resistance to rotation and increasing overall efficiency.

It is also known in the art that the efficiency of devices for converting fluid energy to electricity can be increased by employing two or more of counter-rotating motors, as taught in U.S. Pat. No. 4,174,923 which discloses a windmill having two counter-rotating aerodynamic motors for generating electrical energy.

It has also been suggested that the efficiency of fluid energy conversion devices based upon counter-rotating motors can be increased by advantageously directing the fluid flow against the vanes of each such motor, as disclosed in U.S. Pat. Nos. 4,203,702, 4,960,363, and 5,009,568, and 4,335,319.

U.S. Pat. No. 4,203,702 discloses a water-driven device wherein two vaned counter-rotating hydrodynamic turbines are caused to rotate by directing the incoming water flow against the outermost vanes of each motor. U.S. Pat. No. 4,960,363 describes a fluid flow engine in which the incoming fluid is passed through a venturi-shaped opening that is said to increase the velocity of flow prior to directing the fluid toward the innermost blades of the counter-rotating turbines in the channel formed between the two turbines.

U.S. Pat. No. 5,009,568 discloses a wave-actuated power generating device comprising multiple unidirectional rotating turbines in which a wedge-shaped wave splitter positioned at the point of liquid inlet into the generator directs a portion of each incoming wave directly against the surfaces of the turbine blades.

U.S. Pat. No. 4,335,319 describes a hydrodynamic device for generating electricity wherein the water inlet nozzle directs the liquid flow against the vertically-oriented vanes of a rotating turbine that is bordered along a portion of its circumference by a curvilinear adjacent surface which further helps to concentrate the liquid flow onto the vanes during a pre-determined arc of rotation.

In order to increase the efficiency of generating electrical power from aerodynamic and hydrodynamic devices, it is desirable to minimize the effects of variations in the velocity and direction of fluid flow entering the device and to optimize the position of the device vertically in the fluid stream.

One known method of minimizing the detrimental effect of variable velocity of liquid flow is disclosed in U.S. Pat. No. 5,191,225. It discloses an apparatus for producing electricity from wave power in which changes in water level in a chamber resulting from wave motion causes air to flow through turbines which, in turn, drive an electric generator. In order to minimize rotational speed variations in the turbines, the rotating portion of each turbine contains a massive circumferential ring that acts as a flywheel and provides a level of inertia sufficient to minimize variations in power generation due to variations in wave motion.

A method of minimizing the adverse effect of changes in direction of liquid flow on power generation is suggested in U.S. Pat. No. 5,440,176 which discloses a flexible subsea hydroelectric generating plant. It comprises several ocean current-driven turbine/generators rigidly supported from an undersea platform wherein each turbine generator can be moved vertically, horizontally, or rotated to account for variations in ocean current. Movement of the turbine/generators is controlled from a remote station located on shore or above the water surface.

Another means of optimizing location of hydrodynamically driven motors is disclosed in U.S. Pat. No. 4,850,190 which describes a system for generating thermal energy from ocean currents. A plurality of electrical generating units are suspended vertically from a fully submerged support cable. Each generating unit is pivotally mounted and includes a stabilizer that allows the unit to optimize its position relative to the incoming liquid flow. In order to minimize the forces involved in maintaining the vertical positioning of the system, the support cable and the full weight of the generating units are supported by buoyancy chambers which are anchored to the ocean floor.

Another known method of controlling the location of hydrodynamic motors submerged in river and ocean currents, disclosed in U.S. Pat. No. 4,467,218, involves tethering a vertically oriented current-driven water wheel to a vertical post anchored in the bed of the river or ocean by means of horizontal cables which prevent the motor from being swept away in the direction of current flow.

It is also known that controlled buoyancy of a fully submerged self-contained hydroelectric generating apparatus is important for proper positioning and operation, especially when the apparatus is anchored to the river or ocean bed by means of cables. In order to be of sufficient size and capacity to be effective, such hydroelectric generating units must be massive. Accordingly, the buoyancy of the unit must be closely controlled to maintain proper vertical placement and minimize the stress on the tethering cables. It is also required that the electric generator and auxiliary equipment be maintained in a sealed chamber within the unit for proper operation, as disclosed in U.S. Pat. Nos. 4,219,303, 4,163, 905, and 4,163,904.

U.S. Pat. No. 4,219,303 describes a power plant for generating electricity from ocean currents anchored to the bottom of the sea by means of tether cable secured electrical generators associated therewith which are contained in water tight, air filled chambers within the structure. These chambers serve the dual function of protecting the generators from the ocean environment and contributing buoyancy to the structure. Similarly, U.S. Pat. No. 4,163,905 describes a submerged power machine in which pivotable vertical blades are connected at each end to an endless chain drivingly coupled to an electric generator contained in a flotation air compartment positioned above the compartment containing the blades. Yet another method of achieving the desired buoyancy in a hydrodynamic electric generator while enclosing the electric generator in a buoyancy chamber is disclosed in U.S. Pat. No. 4,163,904 which discloses an underwater turbine in which the fluid flow drives a turbine wheel that is circumferentially geared to an electric generator mounted within an adjacent watertight compartment.

Although the aforementioned processes and systems disclose means for generating electricity from wind, wave, and tidal energy, river flow, and ocean currents, there remains a need for a system which is capable of continuously, uniformly, and efficiently producing large quantities of electricity from the immense energy available from river and ocean currents on a commercial scale without adversely affecting commerce dependent upon such waterways and the ecosystems related thereto. A system meeting such need would greatly reduce the cost of generating electricity, lessen dependence upon dwindling supplies of fossil fuels, and reduce the negative environmental impact inherent in power generation based upon the burning of such fuels.

SUMMARY OF INVENTION

The present invention has met the hereinabove described needs. The invention provides an apparatus and an associated method of generating electricity from generally unidirectional liquid flow by means of counter-rotatable liquid-driven motors contained in a buoyant structure fully immersed in said fluid. The liquid-driven motors generally comprise at least one array of radially-oriented vertical vanes. Each such vane preferably comprises two or more overlapping pivotable vertical subvanes that pivot during rotation of the motor such that each subvane overlaps the adjacent subvane to provide an essentially solid vane when the vane is moving in the direction of liquid flow and to provide openings in the vane through which liquid can pass when the vane is moving counter to the liquid flow. The motors further comprise an inertial mass sufficient to lessen the effect of variations in the speed and force of the incoming liquid and means for directing the incoming liquid to a predetermined point of contact with each vane. The rotation of the liquid-driven motors drives an electrical generator that may also be housed within said buoyant structure.

The invention further provides means for properly positioning the liquid inlet of said buoyant structure relative to the prevailing direction of liquid flow and for controlling the depth and vertical orientation of said buoyant structure within the liquid.

It is an object of the present invention to provide a method and apparatus for efficiently generating electricity from generally unidirectional liquid flow.

It is another object of the present invention to generate electricity from subsurface ocean and river currents and movement of other large bodies of water.

It is a further objective of the present invention to provide a fully submersible system for generating electricity from ocean or river currents by means of rotating hydrodynamic motors.

It is a further object of the present invention to improve the energy conversion efficiency of electricity-generating rotating hydrodynamic motors by reducing the rotational resistance of said motors and by making the motors buoyant.

It is a further object of the present invention to improve the energy conversion efficiency of electricity-generating rotating hydrodynamic motors by reducing the sensitivity of said motors to variations in the speed and volume of liquid flow.

It is a further object of the present invention to improve the energy conversion efficiency of electricity-generating rotating hydrodynamic motors by controlling the direction of flow of the liquid into said motors.

It is a further object of the present invention to produce electricity from a plentiful, renewable energy source in an environmentally safe manner.

It is yet another object of the present invention to provide such a system which makes efficient use of multiple motors in a housing which provides integral buoyancy means.

It is yet another object of the present invention to provide both fixed and movable efficiency enhancing means.

These and other objects of the invention will be more fully understood from the following detailed description of the invention and reference to the illustrations appended hereto.

DESCRIPTION OF PREFERRED EMBODIMENTS

As employed herein, the expression "unidirectional liquid flow" will refer to (a) natural river and ocean currents which during a period of time flow in a generally constant direction and (b) artificially created flow of liquids in a generally constant direction, relative to the system employed in practicing the present invention during a period of operation of the system such that production of electricity will be obtained.

Figure 1:
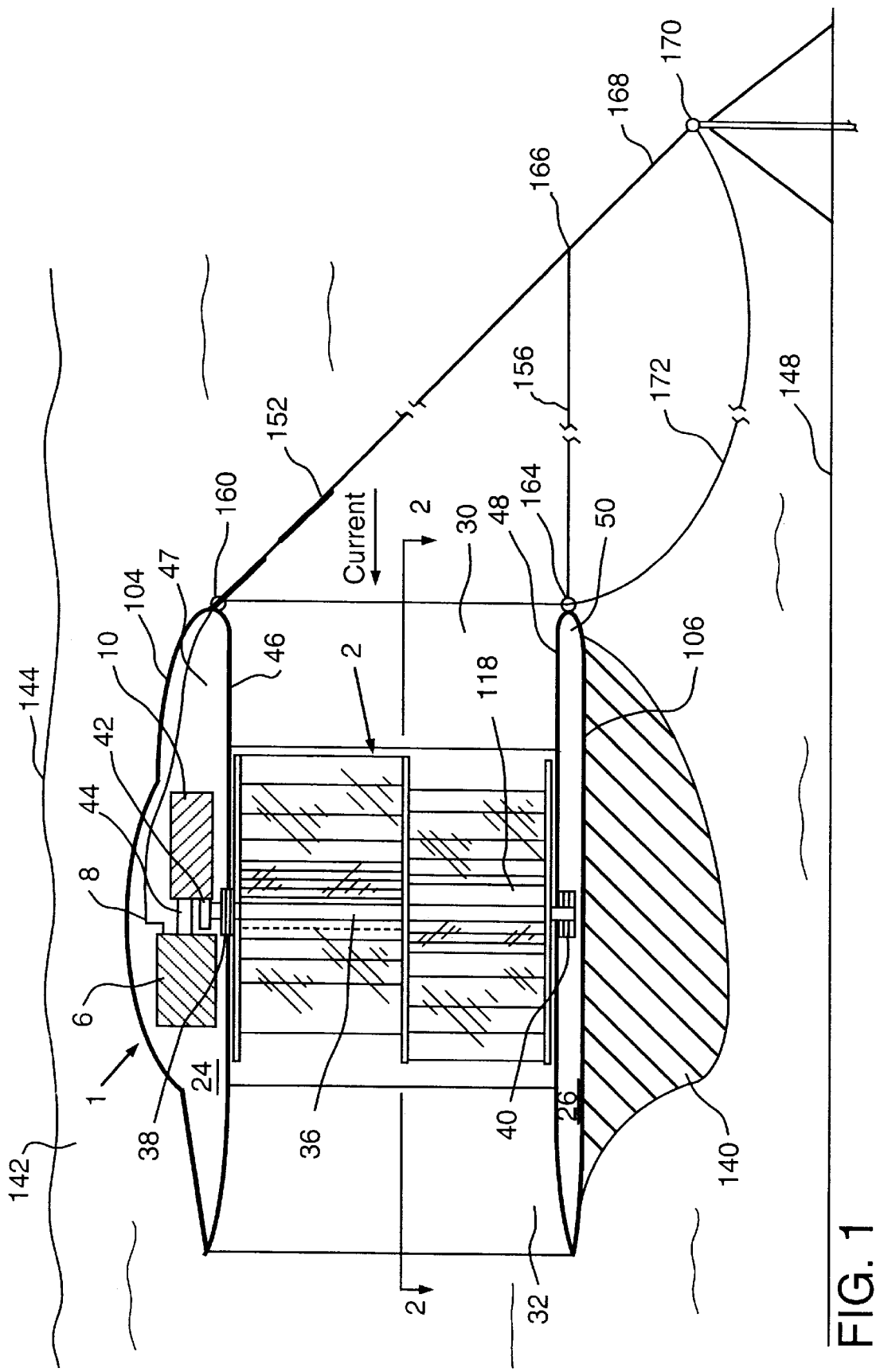
FIG. 1 is a partially schematic vertical cross-sectional illustration of an embodiment of the present invention.
Figure 2:
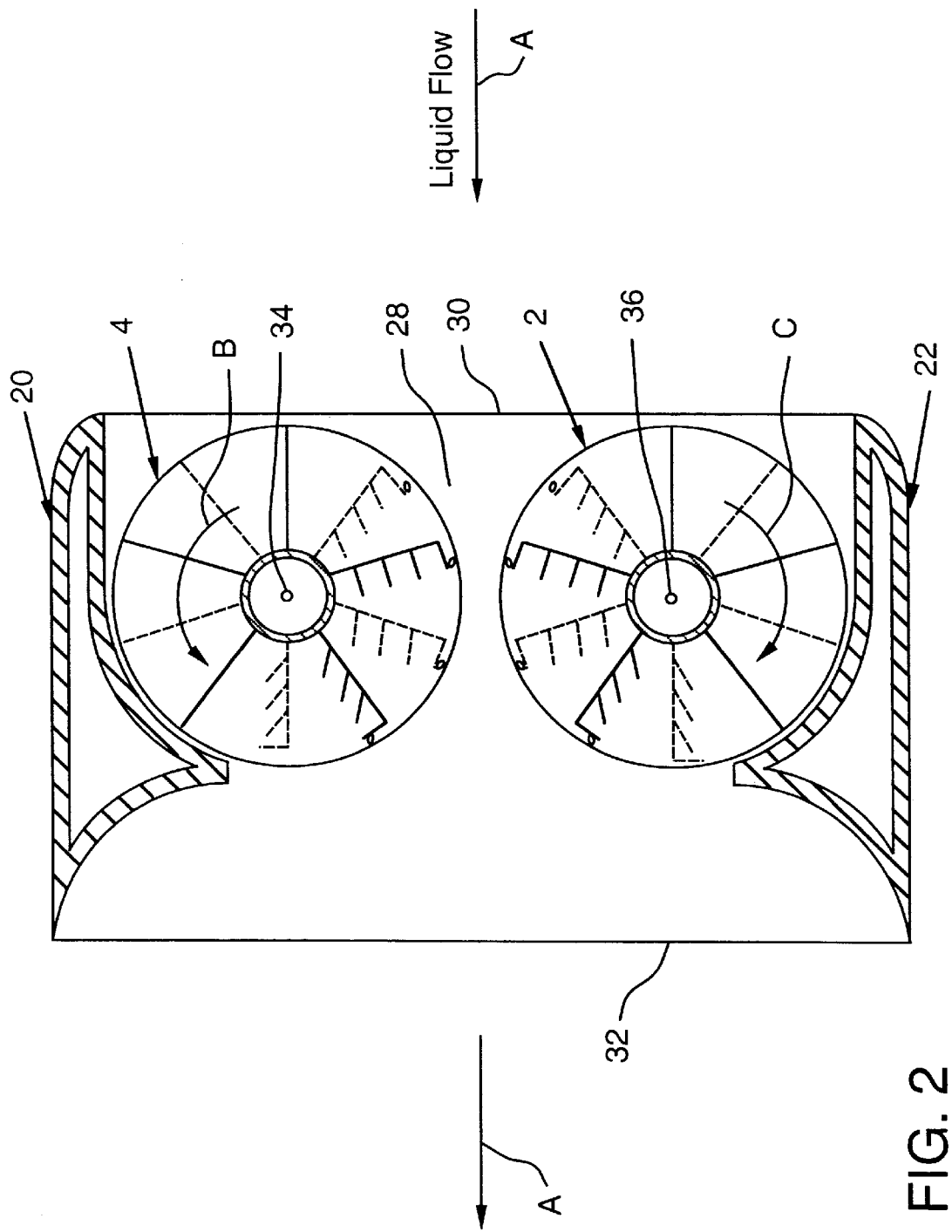
FIG. 2 is a partially schematic horizontal cross-sectional view taken through 2—2 of FIG. 1 of a buoyant structure and two counter-rotating liquid-driven motors employed in an embodiment of the present invention.

FIGS. 1 and 2 illustrate a fully submersible system for generating electricity from unidirectional liquid flow in accordance with the apparatus and method of this invention. The system, as illustrated in FIGS. 1 and 2, has a buoyant housing or structure 1, a pair of generally vertically oriented counterrotating hydrodynamic motors 2 and 4 each driven by a unidirectional liquid flow in the direction of arrow A, a means for generating electricity 6 which may be any form generator known to those skilled in the art. The generator 6 is rotated by drive means 10 which, in turn, is driven by rotation of the hydrodynamic motors. The electricity which is generated is transmitted out of the system by electrical cable 8.

Buoyant housing or structure 1 generally comprises a first side portion 20, an opposite second side portion 22 identical to said first side portion 20, a top portion 24, and a bottom portion 26. Top portion 24 is secured to the top of said side portions 20, 22. Bottom portion 26 is secured to the bottom of said side portions 20, 22 such that buoyant housing 1 further comprises a chamber 28 having a front opening 30 for ingress of liquid flow into said buoyant housing 1 and a rear opening 32 for egress of the liquid flow therefrom, whereby said chamber 28 is traversed by said liquid flow in the directions indicated by arrows A.

In a preferred embodiment, the side portions 20, 22, top portion 24, and bottom portion 26 are hollow to enhance buoyancy. These portions may be made of a suitable, strong material which has the desired formability, corrosion resistance, and durability in an underwater environment. Among the suitable materials are aluminum, steel, nickel, titanium, alloys thereof, and other suitable corrosion-resistant materials with suitable protective coatings where appropriate.

In the form shown in FIGS. 1 and 2, chamber 28 contains at least one pair of counter-rotating, generally vertically-oriented hydrodynamic motors 2, 4 fully submerged in the liquid traversing said chamber 28. Each said motor in the form illustrated is generally vertically oriented and has a rotatable central shaft 34, 36. The rotatable shafts 34, 36 are preferably generally parallel to each other. As shown in FIG. 2, motor 2 rotates in a clockwise direction as shown by arrow C, and motor 4 rotates in a counterclockwise direction as shown by arrow B. As shown in FIG. 1, shaft 36 of motor 2 is secured to upper and lower bearings 38, 40 and has a spur gear 42 fixedly secured thereto which, through gear box 10, produces responsive rotation of shaft 44 which, in turn, provides rotational input power to electrical generator 6. The bottom wall 46 of top portion 24 is traversed by a water-tight centrally-located bearing 38 for receiving the upper portion of central shaft 36 which extends through bearing 38 and bottom wall 46 such that said upper portion of said shaft projects into top space 47. Similarly, the top wall 48 of bottom portion 26 is traversed by a centrally-located bearing 40 for receiving the lower portion of central shaft 36 which extends through said bearing 40 and top wall 48 such that said lower portion of shaft 36 projects into bottom space 26. A similar system (not shown) is provided in motor 4. Each motor 2, 4, in chamber 28 is rotatably attached to top portion 24 and bottom portion 26 of buoyant housing 1 such that said motor is suspended in said chamber 28 in a manner that causes the liquid flow traversing chamber 28 in direction A to rotate said motor shafts 34, 36 about their respective axes.

Figure 3:
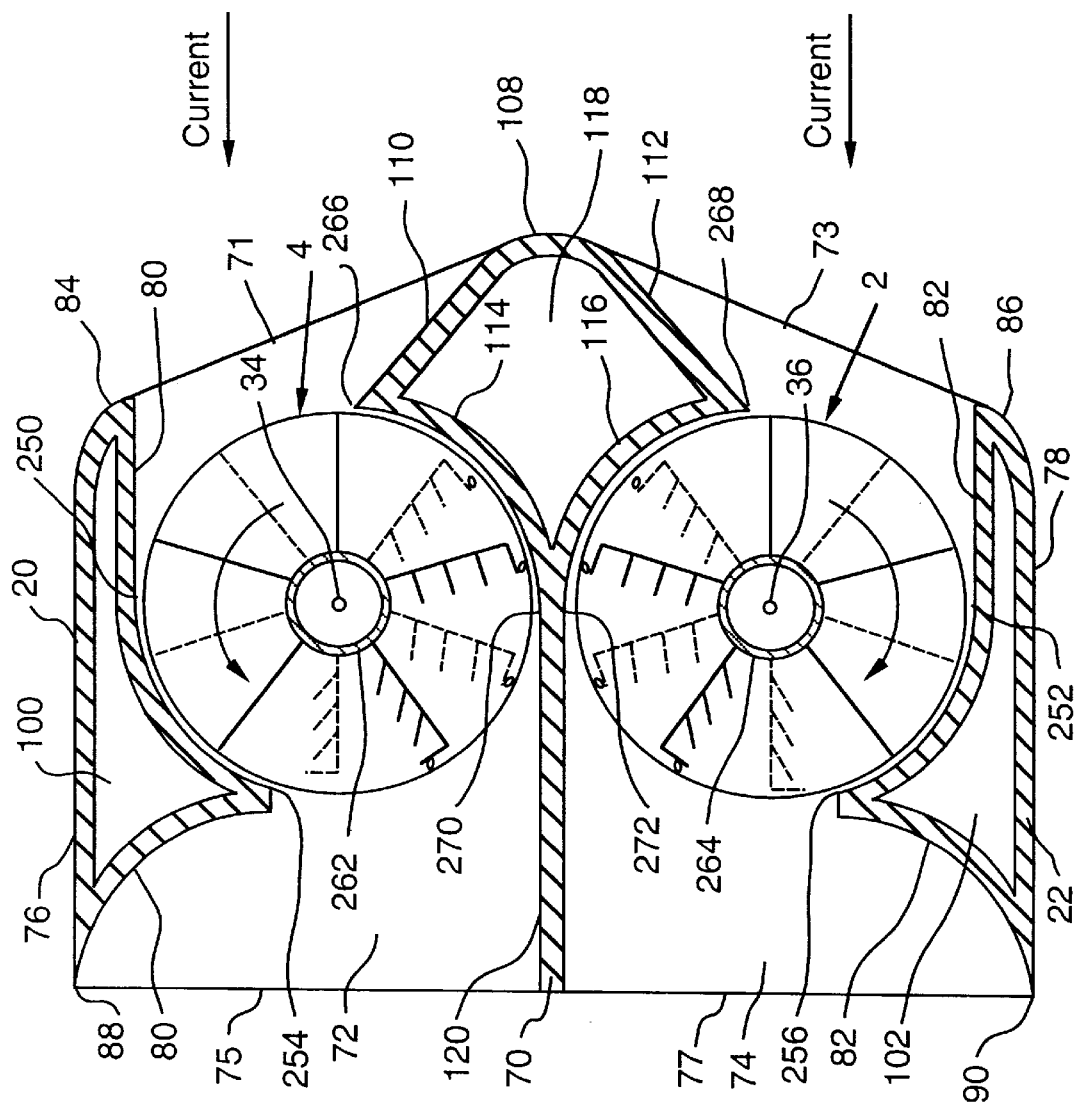
FIG. 3 is a partially schematic horizontal cross-sectional plan view similar to FIG. 2, but showing another embodiment of the buoyant structure and counter-rotating liquid-driven motors of the invention.

As illustrated in FIG. 3, it is preferred that chamber 28 have a central divider wall portion 70 that partitions the chamber 28 into two subchambers 72, 74 of equal size through which generally equal volumes of liquid flow. Each subchamber 72, 74 contains one hydrodynamic motor 2, 4 driven by the liquid flow through said subchamber 72, 74.

It is further preferred that generally identical side portions 20, 22 be hollow and of aerodynamic design to minimize resistance to liquid flow and have, respectively, an outer wall 76, 78, an inner wall 80, 82, a front wall 84, 86, which combine to create a totally enclosed side space 100, 102. Top portion 24 is preferably hollow and of aerodynamic design having a curvilinear domed top wall 104 and a generally planar bottom wall 46 peripherally attached to said domed top wall 104 to create a totally enclosed top space 47 (FIG. 1). Bottom portion 26 will preferably be hollow and of aerodynamic design comprising a generally planar bottom wall 106 and a generally planar top wall 48 peripherally attached to said planar bottom wall to create totally enclosed bottom space 50. It is preferred that central wall portion 70 (FIG. 3) contain a hollow front portion of aerodynamic design comprising a wedge-shaped outer wall 108 consisting of two generally planar surfaces 110, 112 meeting at their front ends to form an apex having an included angle of approximately 75 to 100 degrees. Planar surfaces 110, 112 extend rearwardly from the apex of said outer wall 108 and are connected at their rear ends to rearwardly intersecting curved rear walls 114, 116, respectively, to create totally enclosed central space 118. The remaining portion 120 of the wall 70 in the form shown is of lesser width than the front portion 108, 110, 114, and 116.

The dashed lines in FIG. 3 show the open position of the subvanes as the motor rotates and the solid radial lines show the subvanes in the closed position. It will generally be preferred to have the vanes in closed position during about 40 to 60 percent of the 360 degree rotation of the motor.

In another embodiment of the invention, a single generator 6 may be driven by the output from two or more geared drive means 10 configured to operate in parallel in a manner well known to those skilled in the art. In yet another embodiment of the invention, electrical generator means 6 and geared drive means 10 may be secured in hollow bottom portion 26 and driven by a central shaft output gear secured to the lower portion of central drive shaft 36 extending into said hollow bottom portion 50.

Figure 5:
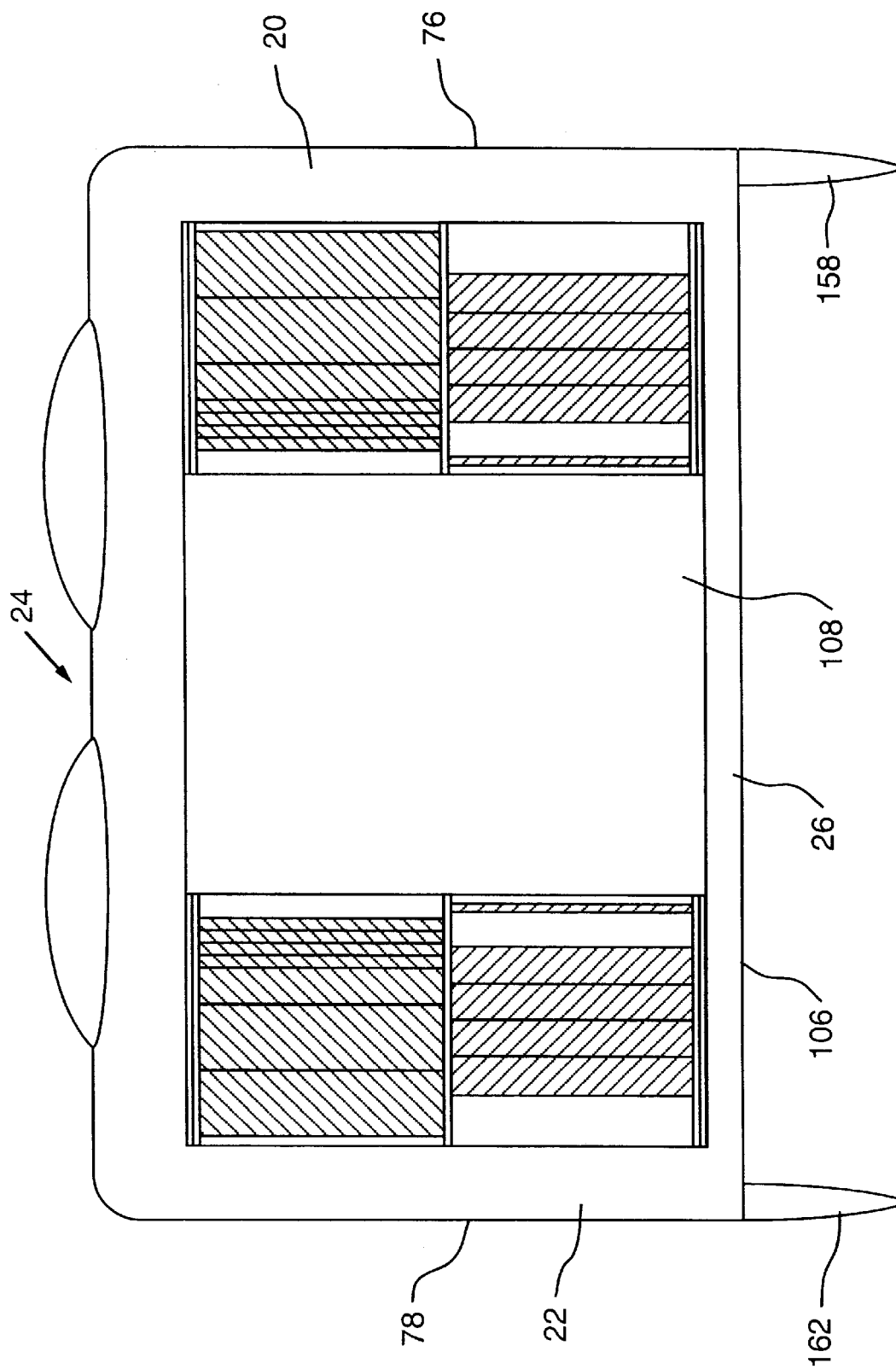
FIG. 5 is a front elevational view of a multiple motor embodiment of the invention showing keel elements.

The buoyancy of buoyant housing 1 may be controlled by the internal volume of side spaces 100 and 102, top space 47, bottom space 50, and central space 118 and the pressure of air or other gas contained within said spaces. The orientation of buoyant housing 1 and, in particular, front opening 30 (FIG. 2) relative to the direction of liquid flow and the vertical orientation and vertical location of said structure within said liquid may be controlled by a centrally located keel 140 (FIG. 1) which extends vertically downwardly from the outer surface of bottom wall 106 of bottom portion 26 or by two or more such keels symmetrically attached to said outer surface of bottom wall 106 (FIG. 5). The size, shape, and weight of each keel would be selected to achieve vertical stability of buoyant housing 1 and the desired vertical orientation and vertical position relative to the liquid flow.

As the preferred use of the system of the present invention will be in the ocean or river to employ the liquid to create electricity, it will be appreciated that the liquid will generally be water. As shown in FIG. 1, the water 142 has an upper surface 144 and a bottom surface 148.

In the form shown, the buoyant housing, structure 1, is attached by any suitable means at points 160, 164 to anchoring cables 152, 156 which are joined at point 166 to form a single anchoring cable 168 that is attached to the bottom surface 148 by anchoring mechanism 170, which may be a rigid rod, or other anchoring means secured into the ocean floor or river bottom and weighted as necessary to counter the force exerted on cables 152, 156, 168 by the force of the current acting on structure 1.

A second anchoring cable 172 will be attached to both structure 1 and the bottom as a safety cable in the event the primary cable 168 should break. Electric cable 8, carrying the power generated by generators 6, will be loosely attached to anchor cables 152, 168 or 172 until it reaches the ocean floor or river bottom 148 where it will connect to a cable 173 on the bottom and extend to the shore where it will connect through a substation to the commercial electric power grid.

Figure 4:
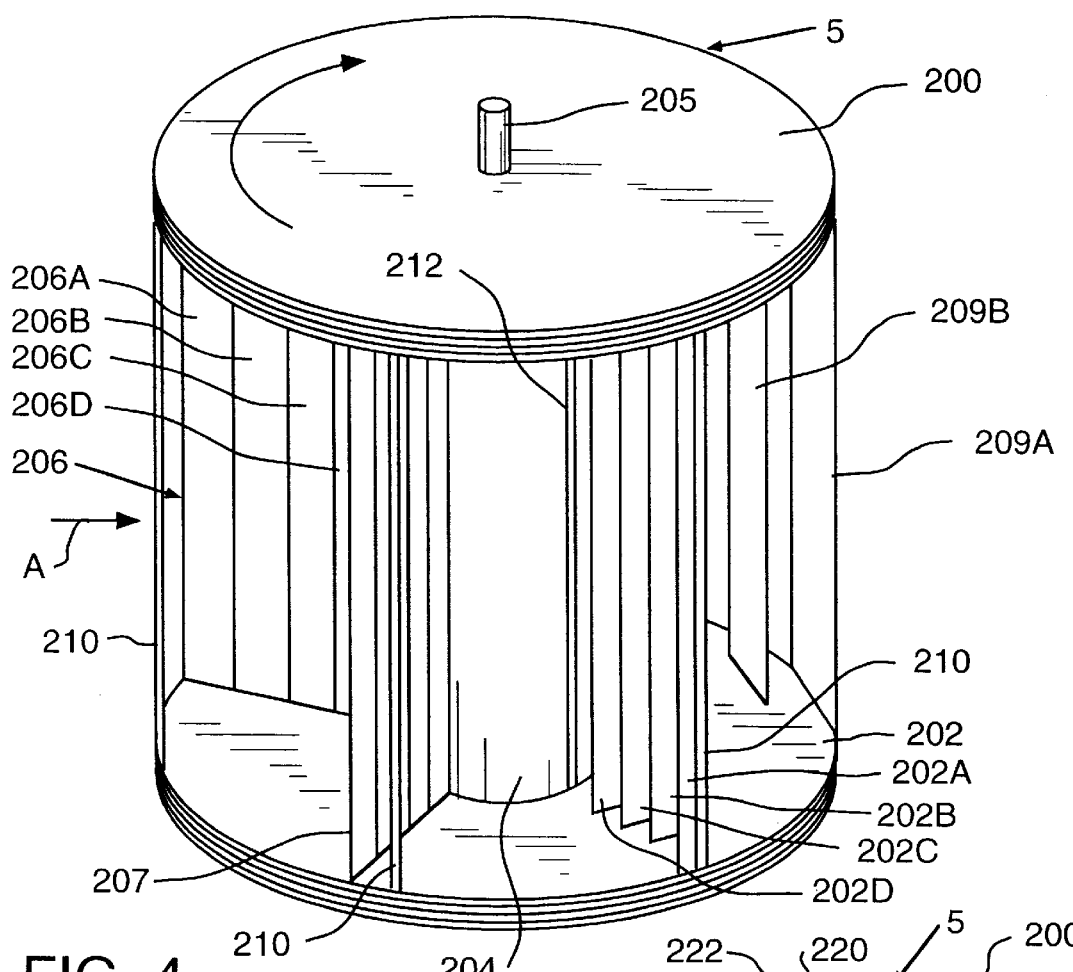
FIG. 4 is a partially schematic perspective view of a liquid-driven motor of the present invention.
Figure 4A:
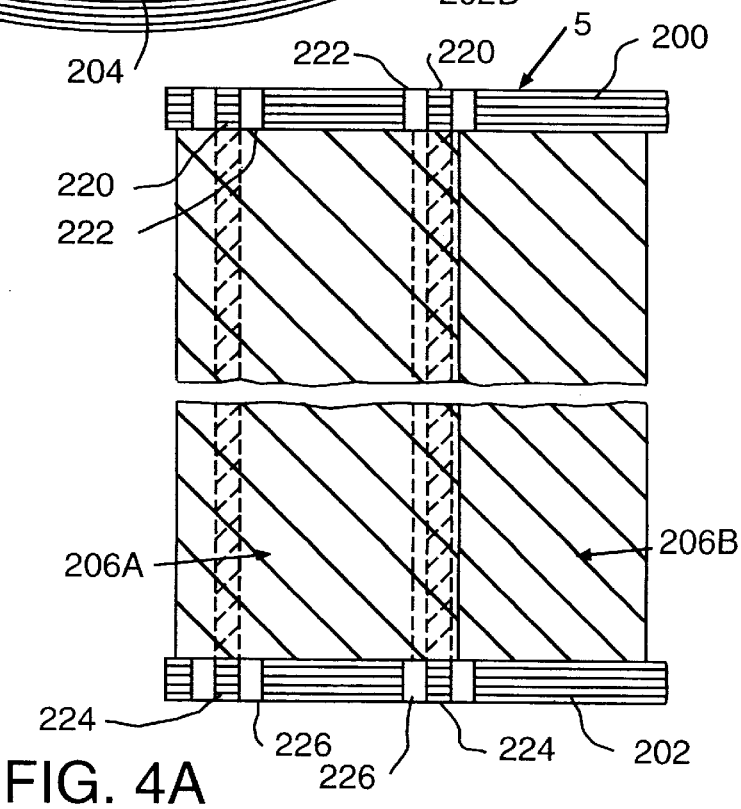
FIG. 4A is a fragmentary cross-sectional illustration of an embodiment of the invention showing details of the vane and subvane construction.

FIGS. 4 and 4A illustrate in greater detail various features of an embodiment of hydrodynamic motors, with liquid flow being in the direction of arrow A.

Referring to FIG. 4, hydrodynamic motor 5 comprises an upper plate 200, a lower plate 202, a centrally-located hollow cylinder 204, central shaft 205 traversing said motor along the central vertical axis of said hollow cylinder 204 and extending vertically upward from said upper plate. At least one array of vanes comprised of a plurality of vertical vanes 206, 207, 208, 209 (the fifth vane is not visible) which are radially oriented relative to hollow cylinder 204 and central shaft 205. Each vane 206, 207, 208, and 209 further contains two or more rigid subvanes 208A, 208B, 208C and 208D, each of which is pivotally attached at the top of its outermost vertical edge to upper plate 200 and at the bottom of its outermost edge to lower plate 202 such that the innermost edge of each subvane is free to pivot about said outermost vertical edge. The subvanes are sized and positioned such that the innermost vertical edge of each subvane overlaps and contacts the outermost vertical edge of the next adjacent subvane when the subvanes are moving in the direction of liquid flow as illustrated at subvanes 206 A–D to effect rotation of shaft 205. When moving counter to the direction of liquid flow, each subvane pivots around said outermost edge, thereby disengaging from contact with said adjacent subvane and creating openings in the vane 208, 209 through which liquid may pass such that the resistance to rotation of said motor 5 is minimized. Mechanical stops 210 which, in the form illustrated, are metal rods secured to plates 200, 202, are positioned adjacent the circumference of upper plate 200 and lower plate 202 rearward with respect to the direction of rotation of the outermost subvane 206A, 207A, 208A, 209A to stop the innermost edge of said outermost subvane from moving beyond the circumference line of the motor.

Hollow cylinder 204 is rigidly connected at its upper end to upper plate 200 and at its lower end to lower plate 202. Central shaft 205 is positioned axially inside the hollow cylinder 204 and rigidly connected adjacent its upper portion to upper plate 200 and adjacent its lower portion to lower plate 202. The totally enclosed space bounded by the inner diameter of hollow cylinder 204, the circumference of central shaft 205, the bottom surface of upper plate 200, and the top surface of lower plate 202 is normally filled with air or another gas to impart buoyancy to hydrodynamic motor 5 such that said motor "floats" between the top portion and bottom portion of buoyant housing 1 in which it is contained, thereby significantly reducing the load on the bearings into which shaft 205 is inserted and the internal resistance of said motor. The reduction in load and internal resistance permits the motor to be relatively large and heavy, thereby allowing hydrodynamic motor 5 to withstand and efficiently convert the very strong forces normally imparted by ocean and river currents into electricity with a minimum of motor friction. It is preferred that the inside diameter of hollow cylinder 204 be in the range of one-tenth to one-third the diameter of upper plate 200 and lower plate 202, in order to achieve the desired buoyancy of said motor 5 and that the inertial mass of upper plate 200 and lower plate 202 be such that said upper plate 200 and said lower plate 202 provide a "flywheel" action sufficient to reduce the rotational effects of variations in the speed and force of the incoming liquid impacting vanes 206, 207. This "fly-wheel" action helps to maintain an essentially constant speed of rotation of the hydrodynamic motor 5.

As illustrated in FIG. 4A, the pivotal attachment of each subvane, such as 206A and 206B, for example, may be achieved by upwardly inserting a cylindrical extension 220 of the top outermost vertical edge of each said subvane into a bearing 222 in upper plate 200 and downwardly inserting a cylindrical extension 224 of the bottom outermost vertical edge of each said subvane into a bearing 226 in lower plate 202 such that each subvane 206A, 206B pivots in response to the direction of the movement of vane 206 relative to the direction of liquid flow impacting the vane. Pivotal attachment of said subvanes may also be achieved by upwardly inserting cylindrical extension 220 of the top outermost vertical edge of each said subvane into a bearing (not illustrated) attached to the bottom surface of upper plate 200 and downwardly inserting cylindrical extension 224 of each said subvane into a bearing (not illustrated) attached to the top surface of lower plate 202, or by any other means that permits said subvanes to pivot in response to changes of their position relative to the direction of liquid flow through buoyant structure 1.

FIG. 4 illustrates the position of subvanes 206A, 206B, 206C, and 206D in the closed position attained when vane 206 travels substantially in the direction of liquid flow and the position of subvanes 208A, 208B, 208C, and 208D and 209A, 209B when vanes 208, 209 travel substantially counter to the direction of liquid flow. Vane 207 in FIG. 4 illustrates the position of subvanes that have closed immediately after passing a plane parallel to the direction of liquid flow.

The innermost edge of the innermost subvane 208D will contact a raised rib 212 on the outer surface of the hollow cylinder 204 to seal the subvane 208D against the hollow cylinder 204 when moving in the direction of liquid flow.

It is preferred that the distance between the topmost horizontal edge of each subvane 206A, 206B, 206C and 206D and the bottom surface of upper plate 200 and that the bottommost horizontal surface of each subvane 206A, 206B, 206C and 206D and the top surface of lower plate 202 be minimized in order to limit the amount of liquid flowing over and under said subvanes when they are in the closed position as shown in FIG. 4.

It is also preferred that hydrodynamic motor 5 contain about four to twelve radially oriented vanes 206, 207, 208, 209 equally spaced circumferentially such that the angular displacement of adjacent vanes is equal throughout the array. It is more preferred that each array be comprised of between about four and eight vanes and most preferred that the array be comprised of five vanes having an angular displacement of 72 degrees between adjacent vanes.

Figure 6:
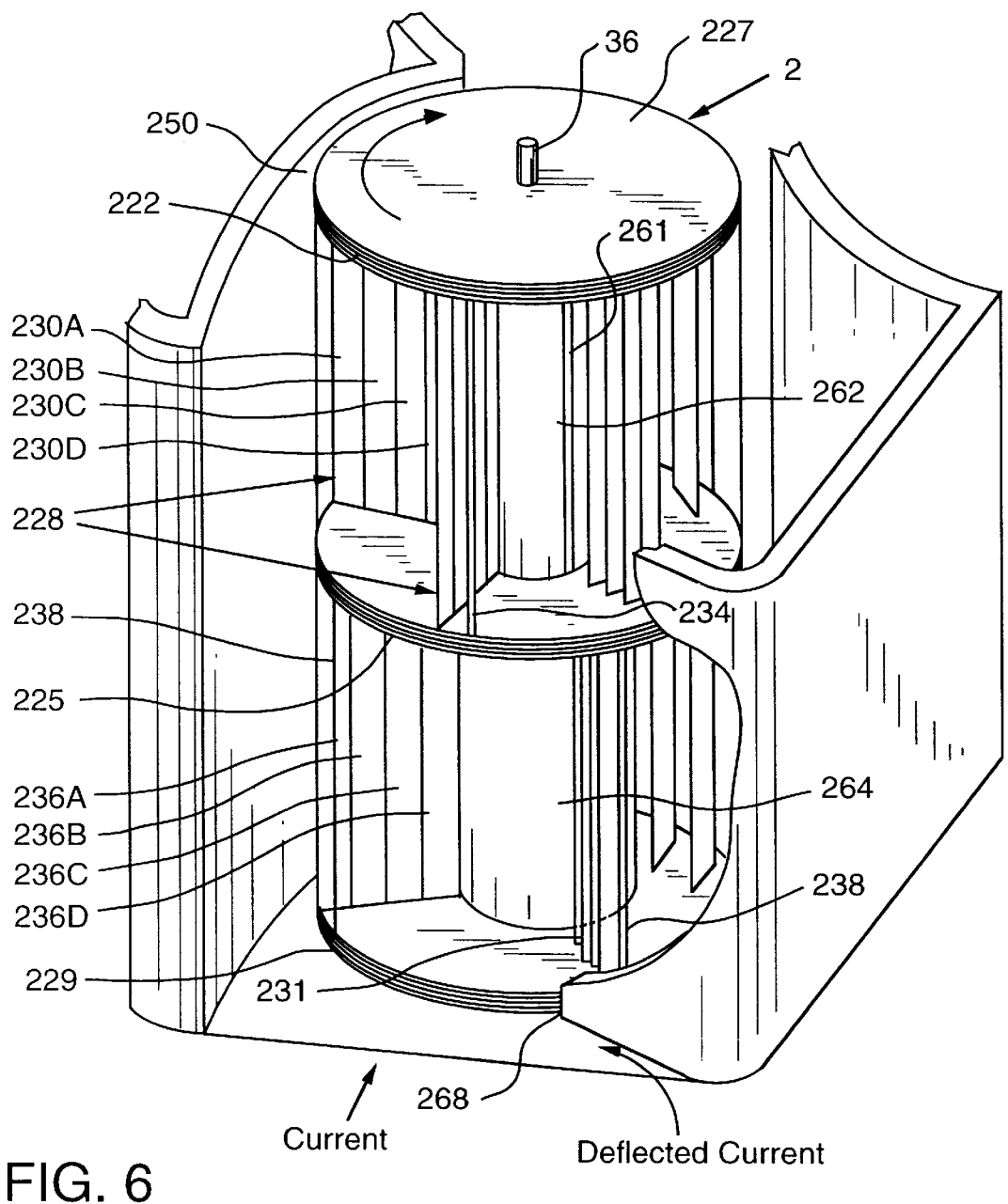
FIG. 6 is a partially schematic perspective illustration of another embodiment of a liquid-driven motor employable in practicing the invention.

In a preferred embodiment of the present invention, illustrated in FIG. 6, hydrodynamic motor 2 further comprises an intermediate plate 225 positioned between upper plate 227 and lower plate 224, a first array of radiallyoriented vanes 228 positioned between upper plate 227 and intermediate plate 225, and a second array of radially-oriented vanes 231 positioned between intermediate plate 225 and lower plate 229.

In the form shown, the vanes are oriented generally vertically with the water current flowing generally horizontally. Each vane 228 in said first array further comprises two or more rigid subvanes 230A, 230B, 230C, 230D, each pivotally attached at the top of its outermost vertical edge to upper plate 227 and at the bottom of said innermost edge to intermediate plate 225 such that the innermost vertical edge of each said subvane is free to pivot about said outermost edge. The subvanes are sized such that the innermost edge of each subvane overlaps and contacts the outermost edge of the next adjacent subvane when the subvanes are moving in the direction of liquid flow to effect rotation of shaft 36 and thereby generate electricity. The innermost edge of the innermost subvane will contact a raised rib 261 on the outer surface of central buoyant cylinder 262 when traveling in the direction of fluid flow, thus sealing the overall vane structure against the central cylinder and resisting undesired liquid leakage past the vane. When moving counter to the direction of liquid flow, each subvane pivots around its outermost edge thereby disengaging from contact with said adjacent subvane creating openings in the vane through which liquid may pass. Mechanical stops 234 are positioned adjacent the circumference of upper plate 227 and intermediate plate 225 rearward of each outermost subvane 230A of each vane to prevent the innermost edge of said outermost subvane from moving beyond the circumference of said motor.

The motors, such as 5, may be of any desired economically practical, technically efficient size. It will generally be preferred to have a motor having an outer diameter D (FIG. 4) measured across plate 200 of at least 5 to 10 feet and most preferably greater than 10 feet. The height H (FIG. 4A) will preferably be at least 5 to 10 feet and most preferably greater than 10 feet.

Each vane 231 in said second array further comprises two or more rigid subvanes 236A, 236B, 236C, 236D each pivotally attached at the top of its outermost vertical edge to intermediate plate 225 and at the bottom of said outermost edge to lower plate 229 such that the innermost vertical edge of each said subvane is free to pivot about said outermost edge. Each subvane is sized such that the innermost vertical edge of said outermost subvane overlaps the outermost vertical edge of the next adjacent subvane when the subvanes are moving in the direction of liquid flow. The innermost edge of the innermost subvane will contact a raised rib (similar to 261) on the outer surface of the central buoyant cylinder 264 when traveling in the direction of fluid flow, thus sealing the overall vane structure against the central cylinder preventing fluid from leaking past the vane. When moving counter to the direction of liquid flow, each subvane pivots around its outermost edge thereby creating openings in the vane through which fluid may pass. Mechanical stops 238 are positioned adjacent the circumference of intermediate plate 225 and lower plate 229 rearward of the outermost subvane 236A of each vane 231 to prevent the innermost edge of said outermost subvane from moving beyond the circumference of said motor.

The inertial mass of intermediate plate 225 is established such that said intermediate plate provides a flywheel action similar to that heretofore described for said upper plate and said lower plate.

It is preferred that the number of vanes 228 in said first array and the number of vanes 231 in said second array are equal and that vanes 228 in the first array are angularly displaced from vanes 231 in the second array, thereby assuring a more uniform speed of motor rotation. The most preferred angular displacement between the vanes in the first array and the vanes in the second array occurs when said vanes in the two arrays are offset by an angle essentially equal to one-half of the angle between adjacent vanes in each said array. This configuration minimizes the tendency of the motor to surge as the vanes approach and pass a position perpendicular to the direction of liquid flow, thereby smoothing the rotational speed of said motor.

Referring to FIGS. 1, 3, and 6, the most preferred embodiment of the present invention comprises a fully submersible system for generating electricity from ocean or river currents in which each hollow side portion 20, 22 of buoyant housing 1 is configured such that (a) the outer wall 76, 78 of said side portion is generally planar in order to decrease resistance to liquid flow and to keep the orientation of outer walls 76, 78 of buoyant housing or structure 1 parallel to the direction of liquid flow, (b) inner wall 80, 82 is generally planar from the front wall 84, 86 of said side portion to the first point of closest adjacency 250, 252 to the circumference of associated hydrodynamic motor 2, 4, (c) inner wall 80, 82 is curvilinear inward from said first point of closest adjacency 250, 252 over an arc of less than 90 degrees to the terminus 254, 256 of the arc, hereinafter the "outer arc of closest adjacency", such that the distance between said inner wall and said circumference of hydrodynamic motor 2, 4 is maintained relatively constant over the length of said inward curvilinear surface, and (d) inner wall 80, 82 extends outwardly rearward from the terminus 254, 256 of said arc of closest adjacency to the point at which said inner wall intersects outer wall 76, 78 at the back edge 88, 90 of said hollow side portion. The outer arc of closest adjacency normally ranges from about 45–80 degrees of rotation of the adjacent hydrodynamic motor and is preferably about 70–75 degrees.

As shown in FIGS. 5 and 6, subchambers 72 and 74 each contain one hydrodynamic motor 2, 4 which is caused to rotate counter-directionally to each other by the liquid flow traversing said subchambers. Each motor 2, 4 30 comprises upper plate 227, lower plate 229, intermediate plate 225, a centrally-located hollow cylinder 262, 264, rotatable central shaft 34, 36 fixedly attached to and extending beyond said upper plate 227 and said lower plate 229, a first array of radially-oriented vertical vanes 228 positioned between said upper plate 227 and said intermediate plate 225, and a second array of radially-oriented vertical vanes 231 positioned between said intermediate plate 225 and said lower plate 229. Each vane 228 contains at least four overlapping subvanes 230A, 230B, 230C, and 230D pivotally attached said upper plate 227 and said intermediate plate 225 and each vane 231 contains at least four overlapping subvanes 236A, 236B, 236C, and 236D pivotally attached to said intermediate plate 225 and said lower plate 229. The first array 228 and said second array 231 each comprise five equally-spaced radially-oriented vertical vanes having an angular displacement between vanes of about 72 degrees, and the vanes 228 of the first array are angularly offset from the vanes 231 of the second array by about 36 degrees. The use of five equally spaced vanes in each array and an angular displacement between arrays equal to one half of the angular displacement between vanes in a single array, combined with the inertial mass of upper plate 227, lower plate 229, and intermediate plate 225, minimizes the tendency of the motor to surge as each vane approaches and passes a position perpendicular to the direction of liquid flow and results in more uniform rotational speed of the motor.

Referring still to FIG. 3, central wall portion 70 dividing chamber 28 (FIG. 2) into equally-sized subchambers 72 and 74 is configured such that generally planar front surfaces 110 and 112 meet to form wedge-shaped outer wall 108. Each said front surface extends rearward from the apex of the wedge formed by the intersection of their forward ends and terminates at a point 266, 268 at which the rearward ends of said front surfaces meet the forward end of curvilinear central inner walls 114, 116, respectively. Curvilinear central walls 114, 116 extend inwardly from said point 266, 268 such that the distance between said curvilinear inner walls and the circumference of each associated hydrodynamic motor 2, 4 is maintained relatively constant over an arc of less than 90 degrees, hereinafter the "inner arc of closest adjacency." At the rear terminus of said arc 270, 272 said curvilinear inner walls intersect each other and the planar rear portion 120 of central wall 70. The inner arc of closest adjacency between said inner wall and said circumference normally ranges from 45 degrees to 90 degrees of rotation of the adjacent hydrodynamic motor. An arc of about 80–90 degrees is preferred. It is also preferred that front surfaces 110 and 112 form an included apex angle of about 80 to 100 degrees such that the incoming liquid is directed toward the vanes of each motor at about 45 degrees as the vanes past the point at which they are generally parallel to the direction of liquid flow and that the length of these surfaces 110, 112 be such that the area of the front opening 71, 73 of each subchamber 72, 74 is approximately one half of the area of the rear opening 75, 77 of each subchamber 72, 74. This difference in the inlet and outlet areas of each subchamber 72, 74 creates an area of lower pressure at the rear of each subchamber 72, 74, thereby drawing the water through the motors at a higher velocity than the velocity of the current in which the system is suspended.

Referring to FIG. 1, two generators 6 (with one being behind the other and not being shown) for producing electricity and two geared drive means 10 are rigidly attached to the bottom wall 46 of top portion space 47. Each generator 6 is driven by one of said geared drive means which, in turn, is driven by the rotation of one of the hydrodynamic motor shafts in the manner heretofore described.

Referring to FIG. 5, two symmetrically located keels 158, 162, each preferably centered beneath one of said hollow side portions 20, 22, are rigidly attached to and extend downward from the outer surface of the bottom wall 106 of bottom portion 26. The keels 158, 162 are positioned and sized to maintain the preferred vertical orientation of buoyant chamber 1 and position the chamber such that the front opening of each subchamber 72, 74 is positioned facing toward the incoming liquid current.

In the embodiment shown in FIGS. 3 and 6, a portion of the liquid current entering each subchamber 72, 74 through the front openings 71, 73 is deflected along front surfaces 110, 112 of wedge-shaped outer wall 108 such that the deflected current contacts vanes 228, 231 of the first and second arrays of the hydrodynamic motor at the point just before each vane reaches a position in the motor's rotation generally parallel to the direction of current flow. A second portion of said entering liquid flow enters each subchamber 72, 74 directly without being deflected by said outer wall 108. As a first vane 228, 231 approaches the position generally parallel to flow direction, the vane is completing a period during which it was rotating counter to the direction of the entering liquid current flow during which time the subvanes associated with said vane were pivotally positioned parallel to the direction of fluid flow as previously described herein thereby creating openings in said vane through which the liquid flowed relatively unimpeded. At the point 266, 268 at which the deflected liquid flow entering each subchamber 72, 74 initially contacts said first vane, the hinged subvanes of said vane are forced by the current to pivot into a closed position wherein each subvane overlaps each adjacent subvane to provide an essentially solid surface against which the current pushes causing the motor to rotate. As the vane is rotated beyond its point of initial contact with the liquid flow toward the first point of closest adjacency 250, 252 to inner wall 80, 82, the force of the current acting upon said vane increases, reaching a maximum when the outermost subvane of vane 228, 231 is positioned generally perpendicular to the liquid flow and nearest the first point of closest adjacency 250, 252. As the first vane continues to rotate past said point of closest adjacency, liquid entering the subchamber exerts a force on both said first vane and the next adjacent following vane. The force on the first vane decreases and the force on the following adjacent vane increases as the adjacent following vane approaches its first point of closest adjacency 250, 252 with inner wall 80, 82, at which point all of the force of the current is concentrated on the adjacent following vane.

As each vane traverses the outer arc of closest adjacency to inner wall 80, 82, the inner wall 80, 82 resists the spilling of the liquid between the vanes over the edge of the vane. This entrapment of liquid between vanes permits continued application of force on the leading vane until it passes the terminus of said outer arc of closest adjacency 254, 256 at which point the full force of the current will be on the adjacent following vane. Once the first vane passes said terminus point 254, 256, the water behind said vane "spills off" of the vane and exits the motor through the rear openings 75, 77 of subchambers 72, 74 and the rigid subvanes of said first vane are pivotally opened by the force of the water through which the vanes are moving as said subvanes are rotated to move in a direction opposite to the direction of the water flow. The subvanes rotate freely in the water and maintain an attitude parallel to the direction of liquid flow as the vane is rotated counter to the liquid flow until the vane traverses the point 266, 268 at which front surface 110, 112 meets the forward portions of curvilinear inner wall 114, 116 at which point the rotational cycle of the motor is repeated.

The force of the ocean or river current driving vanes 228 of the first array of vanes in hydrodynamic motor 2, 4 simultaneously drives vanes 231 of the second array of vanes in each motor in a manner identical to that disclosed herein. The aforementioned angular displacement of about 70–75 degrees between each of the five vanes in said first array and each of the five vanes in said second array, coupled with the angular displacement of about 35–37 degrees between vanes 228 in the first array and vanes 231 in the second array in this embodiment of the invention, results in 10 percent of the total surface of the vanes in the hydrodynamic motor being within about 16 to 20 degrees of rotation of the maximum force of the liquid flow entering the motor at all times during rotation of the motor. The counter-rotation of hydrodynamic motors 2, 4 results in equal forces being applied to the vanes of each motor on opposite sides of the centerline of buoyant housing 1, thereby balancing the opposing rotational forces of the motors and resisting the force of the liquid flow from pushing the structure to one side or the other.

EXAMPLE

Referring to FIG. 1, a specific preferred example will be considered. A geared drive unit 10 is a gear box housing gears that increase the slow rotational speed of approximately 3 to 4 rotations per minute of the hydrodynamic motors, by about 300 times such that each electric generator 6 rotates at a speed of 900 to 1,200 rotations per minute. Hollow top portion 24 of the buoyant structure contains two bulges (one behind the other) in top wall 104 to accommodate two electric generators and two geared drive units situated such that each generator/drive unit combination is situated in enclosed top space 47 above one counter-rotating hydrodynamic motor. The bulges in top wall 104 contain access ports (not shown) that permit access to enclosed top space 47 in order to service and maintain said electric generators, said geared drive units, and upper bearings 38 contained therein when buoyant housing 1 is floated to the surface for periodic maintenance. Access to lower bearing 40 in enclosed bottom space 50 is attained by means of an elevator contained in the centrally-located chamber 118.

While reference has been made herein to systems comprising a certain number of counter-rotating hydrodynamic motors, it will be appreciated that the invention may be practiced with systems comprising a greater number of paired counter-rotating motors.

While hydrodynamic motors comprising a certain number of vanes, subvanes, vane arrays, and angular displacements between said vanes and vane arrays have been disclosed, it will be appreciated that the invention may be practiced with motors comprising a different number of vanes, subvanes, vane arrays, and angular displacements between said vanes and vane arrays.

While certain configurations of buoyant housings or structures have been shown, it will be appreciated that the invention may be practiced with other structural configurations.

While, for simplicity of disclosure, orientation of the buoyant housing generally vertically has been shown, other orientations which permit the disclosed mechanical response to liquid passing through the buoyant housing may be employed.

While certain mechanical means for converting the force of a unidirectional liquid flow into electricity has been shown, it will be appreciated that the invention may be practiced using different means for said conversion.

While for convenience of disclosure certain embodiments of the motors of the present invention have been illustrated and these will have at least one pair of counter-rotating side-by-side motors as by providing two of the motors shown in FIGS. 4 and 4A and the pair of adjacent motors, each of which may have two tiers of vane arrays as in FIGS. 1, 5 and 6, for example, the invention is not so limited. For example, a second or greater number of motor units, each having a pair of counter-rotating motor units fixedly secured to its own output shaft, may be positioned in vertically stacked relative positions or adjacent horizontal arrays, or other desired relationship may be employed.

Whereas particular embodiments of the present invention have been described herein for the purposes of illustration, it will be evident to those skilled in the art that numerous variations of the details may be made without departing from the invention set forth in the appended claims.

I claim:

1. A fully-submersible apparatus for generating electricity from generally liquid flow, comprising:

a buoyant structure having a liquid receiving chamber, a first side portion, a relatively spaced second side portion, a top portion attached to said first and second side portions, and a bottom portion attached to said first and second side portions, at least two pairs of counter-rotatable motors, each of said pairs having two motors being in relative overlying and underlying relationship, said overlying and underlying motors having a common rotatable shaft and a plurality of generally radially oriented vanes each having a plurality of rotatable subvanes, whereby said liquid flow will effect rotation of said vanes and said shaft, vanes of said overlying motor are angularly displaced from said vanes of said underlying motor, said subvanes structured to rotate between a closed position wherein the vane will provide a generally continuous wall which resists liquid flow therethrough and an open position wherein said vane will have openings permitting passage of liquid therethrough, and generating means responsive to liquid flow established rotation of said shaft to generate electricity.

2. The apparatus of claim 1 including said apparatus having at least one pair of counter-rotatable motors each rotating about generally parallel axes.

3. The apparatus of claim 2 including said axes being generally vertically oriented.

4. The apparatus of claim 1 including said liquid receiving chamber having a liquid entry opening for receiving said liquid flow and a liquid discharge opening for discharge of liquid which has flowed through said motor.

5. The apparatus of claim 4 including stop means for limiting rotation of said subvanes.

6. The apparatus of claim 4 including said subvanes being structured to be in a closed position when rotating generally in the same direction as said liquid flow and in said open position when rotating in a direction generally opposed to the direction of liquid flow, whereby efficient rotation of said shaft responsive to said liquid flow will be achieved.

7. The apparatus of claim 1 including said liquid receiving chambers being defined in part by two curvilinear walls which are of generally complementary shape with respect to said motor.

8. The apparatus of claim 7 including said motors having a generally circular external peripheral configuration.

9. The apparatus of claim 1 including transmission means for delivering rotary motion to said generator means responsive to rotation of said shaft.

10. The apparatus of claim 1 including said motor having a pair of spaced disc means secured to a tubular core member, said vanes disposed between said disc means and having said rotatable subvanes rotatably secured thereto, and said shaft being rotatable with said disc means.

11. The apparatus of claim 1 including divider wall means disposed within said liquid receiving chamber between said counter-rotating motors to divide said chamber into two subchambers.

12. The apparatus of claim 1 wherein each said vane contains between 4 and 8 subvanes and the angular displacement of adjacent subvanes is generally equal throughout the array.

13. The apparatus of claim 1 including anchor means for securing said apparatus in position.

14. A fully-submersible apparatus for generating electricity from generally liquid flow, comprising:

a buoyant structure having a liquid receiving chamber, a first side portion, a relatively spaced second side portion, a top portion attached to said first and second side portions, and a bottom portion attached to said first and second side portions, at least one pair of counter-rotatable motors each having a rotatable shaft and a plurality of generally radially oriented vanes each having a plurality of rotatable subvanes, whereby said liquid flow will effect rotation of said vanes and said shaft, said subvanes structured to rotate between a closed position wherein the vane will provide a generally continuous wall which resists liquid flow therethrough and an open position wherein said vane will have openings permitting passage of liquid therethrough, and generating means responsive to liquid flow established rotation of said shaft to generate electricity, said liquid receiving chamber having a liquid entry opening for receiving said liquid flow and a liquid discharge opening for discharge of liquid which has flowed through said motor, and said entry opening being of smaller area than said discharge opening.

15. A fully-submersible apparatus for generating electricity from generally liquid flow, comprising:

a buoyant structure having a liquid receiving chamber, a first side portion, a relatively spaced second side portion, a top portion attached to said first and second side portions, and a bottom portion attached to said first and second side portions, at least one pair of counter-rotatable motors each having a rotatable shaft and a plurality of generally radially oriented vanes each having a plurality of rotatable subvanes, whereby said liquid flow will effect rotation of said vanes and said shaft, said subvanes structured to rotate between a closed position wherein the vane will provide a generally continuous wall which resists liquid flow therethrough and an open position wherein said vane will have openings permitting passage of liquid therethrough, generating means responsive to liquid flow established rotation of said shaft to generate electricity, said motor having an upper support plate fixedly connected to said shaft adjacent said upper portion thereof, said motor having a lower plate oriented generally parallel to said upper support plate and fixedly connected to said shaft adjacent said lower portion thereof, a centrally-located hollow cylinder having an inner diameter greater than the outer diameter of said shaft and being secured to said upper plate and to said lower plate such that said shaft is centered therein and a cylindrical void is created between the outer diameter of said central shaft and the inner surface of said cylinder, at least one array of generally radially-oriented vertical rigid vanes, and each said vane comprising two or more overlapping generally vertical subvanes each having a vertical edge pivotally attached at its upper end to said upper plate and at its lower end to said lower plate and a movable vertical edge that overlaps a vertical edge of the next adjacent subvane when said vane is moving in the direction of fluid flow.

16. The apparatus of claim 15 further comprising an intermediate support plate having a top surface and a bottom surface positioned between said upper plate and said lower plate and oriented parallel thereto, a first generally vertical radially-oriented vane having two or more overlapping vertical subvanes being pivotally attached at their upper ends to said upper plate and at their lower ends to the top surface of said intermediate plate, and a second generally vertical radially-oriented vane containing two or more overlapping vertical subvanes attached at their upper ends to the bottom surface of said intermediate plate and at their lower ends to said lower plate wherein the number of vanes in said second array is equal to the number of vanes in said first array.

17. The apparatus of claim 16 wherein the vanes of said first array are angularly displaced from the vanes of said second array.

18. The apparatus of claim 17 wherein the angular displacement between the vanes in said first and second array is essentially equal to one-half of the angular displacement between vanes in said first array.

19. A fully-submersible apparatus for generating electricity from generally liquid flow, comprising:

a buoyant structure having a liquid receiving chamber, a first side portion, a relatively spaced second side portion, a top portion attached to said first and second side portions, and a bottom portion attached to said first and second side portions, at least one pair of counter-rotatable motors each having a rotatable shaft and a plurality of generally radially oriented vanes each having a plurality of rotatable subvanes, whereby said liquid flow will effect rotation of said vanes and said shaft, said subvanes structured to rotate between a closed position wherein the vane will provide a generally continuous wall which resists liquid flow therethrough and an open position wherein said vane will have openings permitting passage of liquid therethrough, and generating means responsive to liquid flow established rotation of said shaft to generate electricity, having at least one pair of counter-rotatable motors each rotating about generally, parallel axes, said axes being generally vertically oriented, and the outermost subvane of each said vane is mechanically stopped from moving beyond the circumference line of said motor.

20. The apparatus of claim 19 wherein the outer wall of each said hollow side portions is generally planar, the inner wall of each said hollow side portion is planar to the point of closest adjacency to the circumference of said rotating hydrodynamic motor, said inner wall is inwardly curvilinear rearward from said point of closest adjacency over an arc of closest adjacency of less than 90 degrees such that the curvature of said inner wall maintains the distance of closest adjacency over the entire length of said arc.

21. The apparatus of claim 20 wherein said arc of closest adjacency is between 45 degrees and 80 degrees.

22. A fully-submersible apparatus for generating electricity from generally liquid flow, comprising:

a buoyant structure having a liquid receiving chamber, a first side portion, a relatively spaced second side portion, a top portion attached to said first and second side portions, and a bottom portion attached to said first and second side portions, at least one pair of counter-rotatable motors each having a rotatable shaft and a plurality of generally radially oriented vanes each having a plurality of rotatable subvanes, whereby said liquid flow will effect rotation of said vanes and said shaft, said subvanes structured to rotate between a closed position wherein the vane will provide a generally continuous wall which resists liquid flow therethrough and an open position wherein said vane will have openings permitting passage of liquid therethrough, generating means responsive to liquid flow established rotation of said shaft to generate electricity, said buoyant structure comprises:

said hollow first side portion being hollow and bounded by an outer wall, an inner wall, a front edge and a rear edge, said hollow second side portion being hollow and bounded by an outer wall, an inner wall, a front edge and a rear edge, said top portion being hollow, and said bottom portion being hollow.

23. The apparatus in claim 22 wherein the internal voids in said hollow first side portion, hollow second side portion, hollow upper portion, hollow lower portion, the hollow front section of said central portion, and said central hollow cylinder contain pressurized gas.

24. A fully-submersible apparatus for generating electricity from generally liquid flow, comprising:

a buoyant structure having a liquid receiving chamber, a first side portion, a relatively spaced second side portion, a top portion attached to said first and second side portions, and a bottom portion attached to said first and second side portions, and at least one pair of counter-rotatable motors each having a rotatable shaft and a plurality of generally radially oriented vanes each having a plurality of rotatable subvanes, whereby said liquid flow will effect rotation of said vanes and said shaft, said subvanes structured to rotate between a closed position wherein the vane will provide a generally continuous wall which resists liquid flow therethrough and an open position wherein said vane will have openings permitting passage of liquid therethrough, generating means responsive to liquid flow established rotation of said shaft to generate electricity, said liquid receiving chamber having a liquid entry opening for receiving said liquid flow and a liquid discharge opening for discharge of liquid which has flowed through said motor, and the area of said entry opening is generally equal to one half the area of said discharge opening.

25. A fully-submersible apparatus for generating electricity from generally liquid flow, comprising:

a buoyant structure having a liquid receiving chamber, a first side portion, a relatively spaced second side portion, a top portion attached to said first and second side portions, and a bottom portion attached to said first and second side portions, at least one pair of counter-rotatable motors each having a rotatable shaft and a plurality of generally radially oriented vanes each having a plurality of rotatable subvanes, whereby said liquid flow will effect rotation of said vanes and said shaft, said subvanes structured to rotate between a closed position wherein the vane will provide a generally continuous wall which resists liquid flow therethrough and an open position wherein said vane will have openings permitting passage of liquid therethrough, and generating means responsive to liquid flow established rotation of said shaft to generate electricity, and at least one keel extending from the bottom wall of said bottom portion to facilitate in maintaining proper orientation of said apparatus with respect to the direction of liquid flow.

26. A method of generating electricity comprising providing a buoyant structure having a liquid inlet and liquid outlet and at least two pairs of counter-rotatable motor elements, each of said pairs having two motors being in relative overlying and underlying relationship, said overlying and underlying motors having a common shaft, and each having a plurality of radially oriented vanes which in turn have a plurality of rotatable subvanes, said vanes of said overlying motor are angularly displaced from said vanes of said underlying motor, submersing said apparatus within a body of moving liquid, introducing said liquid into the entry opening to establish rotation of said motor, maintaining said subvanes in a closed position when said vanes are moving generally in the same direction as said current and maintaining said subvanes in an open position when said vanes are moving generally opposed to the direction of said current, and employing the output of a shaft fixedly secured to said motor to generate electricity.

27. The method of claim 26 including providing said structure with a pair of side-by-side counter-rotatable motors each rotating about a shaft to which it is fixedly secured and oriented generally parallel with respect to the adjacent said motor.

28. The method of claim 27 including converting the rotary output of said shaft on each said motor to electrical energy.

29. The method of claim 28 including anchoring said apparatus such that said motor shafts will be oriented generally vertically.

30. The method of claim 27 including establishing substantially uniform angular spacing between adjacent radial vanes on a first said motor.

31. The method of claim 26 including providing a divider wall to subdivide said chambers such that side-by-side motors will be separated from each other in respect of liquid flow therethrough.

32. The method of claim 26 including maintaining said subvanes in said closed position during about 40 to 60 percent of the 360 degree rotation of said motor.

33. A method of generating electricity comprising:

providing a buoyant structure having a liquid inlet and liquid outlet and at least one pair of counter-rotatable motor elements each having a plurality of radially oriented vanes which in turn have a plurality of rotatable subvanes, submersing said apparatus within a body of moving liquid, introducing said liquid into the entry opening to establish rotation of said motor, maintaining said subvanes in a closed position when said vanes are moving generally in the same direction as said current and maintaining said subvanes in an open position when said vanes are moving generally opposed to the direction of said current, employing the output of a shaft fixedly secured to said motor to generate electricity, providing said structure with a pair of side-by-side counter-rotatable motors each rotating about a shaft to which it is fixedly secured and oriented generally parallel with respect to the adjacent said motor, and providing said inlet opening with an area substantially smaller than the liquid outlet opening.

34. The method of claim 33 including employing two pairs of side-by-side counter-rotatable motors disposed within a liquid receiving chamber in said apparatus.

35. A method of generating electricity comprising providing a buoyant structure having a liquid inlet and liquid outlet and at least one pair of counter-rotatable motor elements each having a plurality of radially oriented vanes which in turn have a plurality of rotatable subvanes, submersing said apparatus within a body of moving liquid, introducing said liquid into the entry opening to establish rotation of said motor, maintaining said subvanes in a closed position when said vanes are moving generally in the same direction as said current and maintaining said subvanes in an open position when said vanes are moving generally opposed to the direction of said current, and employing the output of a shaft fixedly secured to said motor to generate electricity, providing a divider wall to subdivide said chambers such that side-by-side motors will be separated from each other in respect of liquid flow therethrough, and increasing the velocity of flow of said liquid as it passes through said apparatus as compared with the rate of liquid current flow prior to entry into said apparatus.

36. A method of generating electricity comprising:

providing a buoyant structure having a liquid inlet and liquid outlet and at least one pair of counter-rotatable motor elements each having a plurality of radially oriented vanes which in turn have a plurality of rotatable subvanes, submersing said apparatus within a body of moving liquid, introducing said liquid into the entry opening to establish rotation of said motor, maintaining said subvanes in a closed position when said vanes are moving generally in the same direction as said current and maintaining said subvanes in an open position when said vanes are moving generally opposed to the direction of said current, employing the output of a shaft fixedly secured to said motor to generate electricity, providing said structure with a pair of side-by-side counter-rotatable motors each rotating about a shaft to which it is fixedly secured and oriented generally parallel with respect to the adjacent said motor, and each said motor having an upper array of said vanes and an underlying lower array of said vanes.

37. The method of claim 36 including establishing substantially uniform spacing between adjacent vanes on each said motor with said spacing being generally equal for all said motors, and with respect to said upper and lower arrays of vanes on each said motor placing the radial vanes of the upper said array at an angularly offset position with respect to an adjacent underlying lower said array of vanes.

38. The method of claim 37 including said offset being about one-half the angle between circumferentially adjacent vanes in the other said array of vanes in said motor.

* * * * *

UNITED STATES PATENT AND TRADEMARK OFFICE
CERTIFICATE OF CORRECTION

PATENT NO. : 6,109,863
DATED : August 29, 2000
INVENTOR(S) : Larry D. Milliken

It is certified that error appears in the above-identified patent and that said Letters Patent is hereby corrected as shown below:

<u>Column 9,</u>
Line 57, "radiallyori-ented" should read -- radially-oriented --.

<u>Column 11,</u>
Line 30, remove -- 30 --.

Signed and Sealed this

Second Day of April, 2002

Attest:

JAMES E. ROGAN
*Attesting Officer*  *Director of the United States Patent and Trademark Office*